Nov. 14, 1944.     G. DURST     2,362,893

SOLDER

Filed April 4, 1942

George Durst,
Inventor.
Haynes and Koenig
Attorneys.

Patented Nov. 14, 1944

2,362,893

UNITED STATES PATENT OFFICE 2,362,893

SOLDER

George Durst, Attleboro, Mass., assignor to Metals & Controls Corporation, Attleboro, Mass., a corporation of Massachusetts Application April 4, 1942, Serial No. 437,659

2 Claims. (Cl. 29—180)

This invention relates to solders, and more particularly to composite metal solders for brazing.

Among the several objects of this invention are the provision of a solder which has a relatively low melting point, yet which is ductile, and easily cold-worked in its prepared form; the provision of a silver solder of the above type in solid form particularly for brazing which has high ductility and elongation before use; the provision of a silver brazing solder having relatively great tensile strength after fusion and said relatively low melting point and high ductility before use; and the provision of a solder of the class indicated which is in wire, sheet or tube form and which can be easily made by readily available means. Other objects will be in part apparent and in part pointed out hereinafter.

The invention accordingly comprises the ingredients and combinations of ingredients, the proportions thereof, steps and sequence of steps, and features of composition and manipulation, which will be exemplified in the products and methods hereinafter described, and the scope of the application of which will be indicated in the following claims.

In the accompanying drawing, in which are illustrated several of various possible embodiments of the invention, Fig. 1 is a sectional view of one embodiment of the invention;

Similar reference characters indicate corresponding parts throughout the several views of the drawing.

In the art of soldering two qualities of the solder which have been recognized as desirable are low melting point, and high tensile strength after a soldered joint has been formed therefrom. Solders have in general been divided into two classes designated respectively as (1) soft solders, or solders having a melting point of the order of 300 to 500° F., and (2) silver solders, having a melting point of the order of 1200 to 1500° F. The soft solders in general form a soldered joint having relatively low tensile strength. The silver solders have a high tensile strength and are employed for brazing, where such strength is desired. Attempts have been made to prepare a solder which has a relatively low melting point, yet forms a joint having a relatively high tensile strength. Such attempts have been relatively unsuccessful. The process of manufacture is difficult and the solders obtained are brittle to the degree that it is substantially impossible to form them into a wire, sheet or tube form, for commercial use. For this reason solders which have a low melting point, and which form a joint with a high tensile strength have been little used.

According to the present invention a solder is formed which in its manufactured form is ductile and easily cold-worked so that it presents no manufacturing difficulties, yet has the desirable characteristics of relatively low melting point and the property of forming a joint with a high tensile strength.

According to the present invention the solder is in the first place made in the form of a composite metal. Such a composite metal is formed of two or more metal or alloy constituents.

Figure 1:
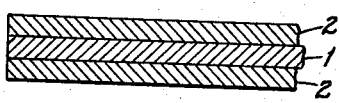

The invention will first be described as embodied in a composite metal formed from two different kinds of metals or alloys. Referring now to Fig. 1, a laminated composite metal solder is illustrated, in which layer 1 is fine silver, a silver alloy or silver solder, and each layer 2 is tin. These layers are laminated together by any of the well-known methods. For example, the silver can be rolled down and the tin plated thereon either electrochemically, or mechanically as by dipping or spraying. The resulting lamination can be used in that form, or can be further rolled down if desired.

Figure 2:
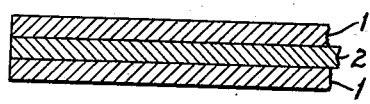
Fig. 2 is a section of an alternative embodiment.

Fig. 2 illustrates a composite metal solder formed with the layers reversed; that is, a center layer of tin is coated with outer layers of silver or a silver alloy. The embodiments of Figs. 1 and 2 are relatively easier to prepare than an embodiment in which only two layers are utilized, since it is usually simpler from a mechanical standpoint to coat both sides of a center layer. However, a two-layer composite metal solder is equally useful, and such is within the invention.

The rolling step, if employed, is carried out very easily, since the laminated ingot possesses the properties of ductility and elongation. If the silver and tin constituents were alloyed together, however, the alloy would not have these properties.

The laminated solder made as described should be rolled down so that the thickness of the higher melting constituent (silver in this case) is not substantially in excess of .005 of an inch. It has been found, that when this is done the constituents of the solder will at the moment of using mutually dissolve and will fuse together into an alloy at a relatively low temperature of the order of about 1000° F. The resulting alloy has a high tensile strength but relatively little elongation.

The high-melting-point silver constituent of the composite solder referred to is fine silver, or silver solder which has for example the following composition by weight:

| | Per cent |
|---|---|
| Silver | 40 to 80 |
| Copper | 0 to 30 |
| Zinc | 5 to 25 |
| Cadmium | 5 to 25 |
| Tin | 0 to 10 |

The low-melting-point tin constituent may be either pure tin or an alloy which has a composition within the following range:

| | Per cent |
|---|---|
| Tin | 0 to 100 |
| Antimony | 0 to 15 |
| Cadmium | 0 to 100 |
| Lead | 0 to 10 |
| Bismuth | 0 to 10 |
| Zinc | 0 to 50 |

Figure 3:
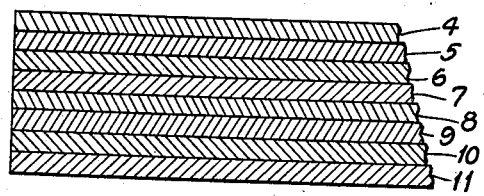
Fig. 3 is a section of another form of the invention.

Fig. 3 illustrates another embodiment of the invention in which there are more layers, each composed of one of the constituents of the alloy desired after fusing. For example, layer 4 can be zinc, layer 5 cadmium, layer 6 tin, layer 7 silver, layer 8 zinc, layer 9 cadmium, layer 10 tin, and layer 11 silver, etc.

Figure 4:
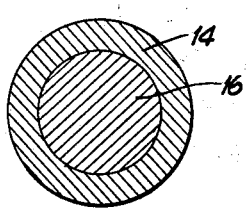
Fig. 4 is a section of a different form.
Figure 5:
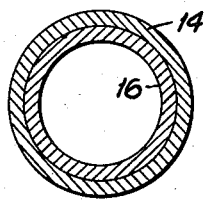
Fig. 5 is a section of another form of the invention.

Figs. 4 and 5 illustrate still further embodiments of the invention. In Fig. 4 two constituents are formed as a rod or wire. Constituent 14 in this instance is tin, and constituent 16 is silver, although their relative positions may be reversed if desired.

Fig. 5 illustrates a tube, likewise formed of two constituents which may be tin (14) and silver (16), or vice versa.

A thin wire may be formed of one constituent and the other constituents plated on successively, or the successive constituents may be formed as a tube. Either the rod or the tube may be drawn down. Also, the plating operations in these cases may be carried out in a number of steps.

Another feature of the invention is that the components of the respective constituents shall not substantially exceed .005 of an inch, or at least that the thickness of the component of the higher melting constituent shall not substantially exceed this figure. The relatively thin character of the components, and particularly of the high-melting-point layer or layers makes possible an effective alloying of the respective constituents at the time of use of the solder.

One method for making the solder is to roll down the initial constituent to a thin foil, and then electroplate the other constituents in relatively thin deposits. If desired, however, the layers can be fused together by bonding them in ingot form by the customary plating methods, and then rolling down the resulting ingot. A convenient way for preparing a laminated solder having a large number of layers is to dip a plurality of spaced foils of one constituent into the other constituent in molten form. The resulting product may then be rolled down.

Figure 6:
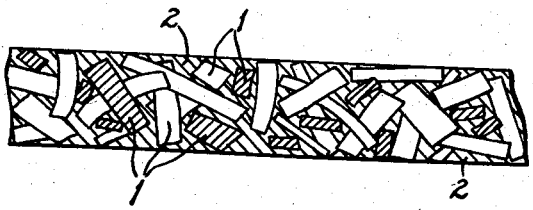
Fig. 6 is a section of another form of the invention.

Fig. 6 illustrates a still further form of the invention, where relatively short pieces of the silver alloy (or fine silver), in wire form, have been placed in a mold and the mold then filled with molten tin. The resulting product is as shown having the particles of silver alloy 1 embedded in the tin 2. The particles are preferably compressed to the proper density of packing before the molten tin is added so that the proper proportion of tin will be incorporated. The finished ingot, slab or other form in which the composite metal is obtained, may then be rolled down to any desired thickness.

Instead of small pieces of wire, small pieces of thin foil may be substituted. The particles need not be of any particular size or shape provided the particles of the higher melting constituent do not substantially exceed .005 of an inch in thickness in the final composite metal product, and are not so small as to be dissolved by the liquid tin during the manufacture of the solder.

In the following examples, which illustrate the invention, all parts are by weight:

*Example 1*

A composite metal solder is made by coating an alloy of 500 parts of silver, 155 parts of copper, 165 parts of zinc, and 180 parts of cadmium, with tin by electroplating. The tin comprises approximately 25% of the weight of the completed composite metal. The composite metal has a thickness of .003 of an inch. This solder melts at 850 to 1000° F. If rolled down to .0015 of an inch, it flows at approximately 900 to 950° F.

*Example 2*

A composite metal is formed by coating an alloy of 605 parts of silver, 225 parts of copper, 70 parts of zinc, and 100 parts of cadmium, with tin by dipping. The tin in the resulting composite metal amounted to 19 to 21% by weight. The composite metal, when rolled until the silver alloy layer is approximately .001 to .0012 of an inch in thickness, flows at 900 to 920° F.

The following table illustrates the effect of varying the proportion of tin. The silver alloy of Example 1 was used.

| Tin contents by weight | Flowing range |
|---|---|
| | °F. |
| 35% | 780–800 |
| 25% | 880–900 |
| 15% | 940–960 |
| 10% | 1,000–1,020 |

In lieu of the tin constituent of the composite metal, an alloy of 80 parts of cadmium and 20 parts of zinc; or one of 35 parts of cadmium, 35 parts of zinc, and 30 parts of tin; or one of 49 parts of zinc, 50 parts of cadmium, and one part of an alkali metal may be substituted.

The relatively lower melting tin, cadmium or zinc alloy may in any instance be coated with the silver or silver alloy if desired.

The brazing operation utilizing the solders of the present invention is preferably carried out with relatively low-melting fluxes. Two examples of such fluxes are as follows (all parts are by weight):

| | Parts |
|---|---|
| Potassium chloride | 32 |
| Sodium chloride | 12 |
| Potassium acid fluoride | 6 |
| Lithium chloride | 20 |
| Cadmium chloride | 30 |
| or | |
| Potassium acid fluoride | 30 |
| Borax | 70 |

The latter mixture is preferably treated with hydrogen peroxide. The former mixture is crystalline; the latter glass-like. The former melts and spreads at approximately 700° F., and the latter between 950 and 1000° F. The latter glasslike flux is preferred for brazing on iron and lowcarbon steel.

The following table gives the preferred embodiments of the invention for use with different brazing ranges, and with different thicknesses of metal which are to be soldered:

| Brazing range | Thickness of the metal to be soldered | Thickness of the high melting constituent | Weight per cent of the low melting constituent in the foil |
|---|---|---|---|
| | | Inches | |
| Approx. 820° F | Below 1/32 | .0005–.002 | 30–35 |
| Do | Above 1/32 | .0005–.0025 | 30–35 |
| Approx. 920° F | Below 1/32 | .0005–.0025 | 20–25 |
| Do | Above 1/32 | .0005–.003 | 20–25 |
| Approx. 980° F | Below 1/32 | .0005–.003 | 12–15 |
| Do | Above 1/32 | .001–.004 | 12–15 |
| Approx. 1040° F | Below 1/32 | .001–.004 | 8–10 |
| Do | Above 1/32 | .001–.005 | 8–10 |

The thickness given for the high-melting constituent is the thickness for each individual layer or portion thereof.

Attention is directed to my copending application, S. N. 525,683, filed March 9, 1944.

In view of the above, it will be seen that the several objects of the invention are achieved and other advantageous results attained.

As many changes could be made in the above methods and constructions without departing from the scope of the invention, it is intended that all matter contained in the above description or shown in the accompanying drawing shall be interpreted as illustrative and not in a limiting sense.

I claim:

1. A composite metal solder composed of a plurality of separate metal constituents, one of said constituents being selected from the group consisting of silver, and alloys of silver containing: zinc approximately 5–25%, cadmium approximately 5–25%, copper not substantially in excess of 30%, and tin not substantially in excess of 10%, said constituent being not substantially thicker than .005 of an inch, and another of said constituents being selected from the group consisting of tin, cadmium, and alloys thereof containing: antimony not substantially in excess of 15%, lead not substantially in excess of 10%, bismuth not substantially in excess of 10%, and zinc not substantially in excess of 50%, said alloys containing not substantially less than 50% of at least one metal selected from the group consisting of tin and cadmium; said other constituent constituting approximately 8–35% by weight of the solder.

2. The method of forming a composite metal solder which comprises forming a solder composed of a plurality of separate metal constituents, one of said constituents being selected from the group consisting of silver, and alloys of silver containing: zinc approximately 5–25%, cadmium approximately 5–25%, copper not substantially in excess of 30%, and tin not substantially in excess of 10%, said constituent being not substantially thicker than .005 of an inch, and another of said constituents being selected from the group consisting of tin, cadmium, and alloys thereof containing: antimony not substantially in excess of 15%, lead not substantially in excess of 10%, bismuth not substantially in excess of 10%, and zinc not substantially in excess of 50%, said alloys containing not substantially less than 50% of at least one metal selected from the group consisting of tin and cadmium; said other constituent constituting approximately 8–35% by weight of the solder; by coating one of said constituents with another of said constituents and adjusting the thickness of the silver constituent to not more than approximately .005 of an inch.

GEORGE DURST.